(12) United States Patent
Curtis et al.

(10) Patent No.: US 6,966,010 B1
(45) Date of Patent: Nov. 15, 2005

(54) APPLICATION CONTAINER THAT ALLOWS CONCURRENT EXECUTION ON MULTIPLE NODES IN A CLUSTER

(75) Inventors: James R. Curtis, Placerville, CA (US); Eric M. Soderberg, Mountain View, CA (US); James M. Nissen, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 685 days.

(21) Appl. No.: 09/942,911

(22) Filed: Aug. 31, 2001

(51) Int. Cl.[7] .............................................. G06F 11/00
(52) U.S. Cl. ....................................................... 714/4
(58) Field of Search ............................................ 714/4

(56) References Cited

U.S. PATENT DOCUMENTS

2001/0056554 A1 * 12/2001 Chrabaszcz .................. 714/13

* cited by examiner

*Primary Examiner*—Bryce P. Bonzo

(57) ABSTRACT

The present invention provides a process for providing High Availability applications on a Cluster without utilizing a fail-over mechanism. The process utilizes a first instantiation of a Package containing information needed to implement an application on a first Node of a Cluster. Additionally, the process utilizes a second instantiation of the Package on at least one second Node of the Cluster. Upon detection of a fault condition or possible fault condition in an application, a Cluster management system transfers operation of the application from the first Node to the second Node. The second Node utilizing the second instantiation of the Package to immediately implement the application without requiring the Cluster management system to fail-over the application.

21 Claims, 2 Drawing Sheets

APPLICATION CONTAINER THAT ALLOWS CONCURRENT EXECUTION ON MULTIPLE NODES IN A CLUSTER

TECHNICAL FIELD

The present invention relates to a field of packages utilized on clusters of computer systems. More specifically, the present invention relates to failing-over of applications configured to run on clustered computer systems and a method of eliminating the need to fail-over applications.

BACKGROUND

Commonly, pluralities of computers, databases, printers and other computing or computing related devices are often established in clusters or as members or elements of a network, hereafter, collectively "Clusters". Cluster are often defined as parallel or distributed systems that consist of a collection of interrelated whole computers, that is utilized as a single, unified computing source. As such, it is commonly appreciated that Clusters commonly consist of computing devices (i.e., Nodes) and other peripheral devices to which access thereto may be controlled by particular Nodes. Clusters enable information system managers to share a computing load over several systems, thereby enhancing the capabilities of the system as a whole, minimizing the adverse effects of failures of certain Nodes or devices on a Cluster, and allowing for the expansion of capacity and capabilities of a given Cluster by adding additional or different Nodes and/or devices to the Cluster. Often Clusters are designed to be Highly Available (i.e., the resources associated with the Cluster have a minimum operating reliability, often measured in the 99.99% range and better). As is well known in the art, High Availability implies that faults in services provided by a Cluster will be detected within a specified time parameter and restored within a specified time parameter.

As Clusters have increased in use, size and complexity, products have been developed that manage such Clusters. One such product is SERVICEGUARD®, developed by HEWLETT PACKARD®. In order to provide the desired High Availability, many of the Cluster management products today utilize a fail-over mechanism when a fault is detected on a Node of a Cluster. The fail-over mechanism basically provides that when a Node on which an application is running fails, for whatever reason, the application is "failed-over" to another Node. In the fail-over process, essentially, the application is restarted on a new Node within a given amount of time. Cluster managers often utilize "Packages", that contain all the resources that an application might need in order to run on a Node. These Package essentially provide the information needed by the fail-over Node in order to restart the application. Examples of information a Package may contain include information relating to the type of storage an application utilizes, the IP addresses that it uses for clients that connect to the application and other information that basically enables the application to run on the system. Cluster management tools, such as SERVICEGUARD®, often are capable of monitoring Packages and starting them as necessary in order to activate an application on a Cluster. Further, when a fail-over occurs, it is the Package that is usually provided to the fail-over Node by the Cluster manager.

Further, in addition to providing a container of resources needed to fail-over an application, Packages also provide other benefits. Since all the resources are in one container, a Package makes it easy for Cluster managers to monitor and manage the associated application. Cluster managers, via the Package, can see what components are functioning optimally and also extend the application in interesting ways. For example, if storage devices need to be added for use with a given application, the needed devices can merely be added to the Package and then be available to the application regardless of the Node on which the Package is currently running.

However, as Clusters become more common, many new applications are being developed which are essentially, "Cluster Aware", i.e., they appreciate the fact that the application is not merely running on a single computer and instead is running on a Node of a Cluster. With Cluster Aware applications, it is often undesirable to require an application to fail-over to a new Node whenever a fault is detected, because such fail-over is often inefficient, and needed data is often lost. Further, many of these Cluster Aware applications desire to implement instantiations of themselves on every Node in the Cluster. As such, they often do not behave as non-Cluster aware applications when a fail-over occurs because of the instantiations of themselves often are not amenable to the commonly utilized fail-over processes. Examples of Cluster aware applications include volume management services, and ORACLE® database applications, where the database is implemented on multiple Nodes for performance purposes.

In particular, ORACLE® database operations are commonly implemented on a Cluster such that each Node has a specific instance of the ORACLE® application. Each Node is capable of implementing the application but does not know that the application also exists on other Nodes of the Cluster. As such, the application is commonly implemented simultaneously on multiple Nodes, thereby wasting and inefficiently utilizing Cluster resources. Thus, a need exists for a process which enables Cluster aware applications to maintain High Availability without requiring the application to fail-over to other Nodes.

One way to provide for the multiple instantiations of applications on multiple Nodes in a Cluster manager system is to hard-code the multiple instantiations into the source code for the Cluster management software. This hard-coding enables the Cluster management software to appreciate, at start-up, that multiple copies of an application are to be implemented on the Nodes of the Cluster and to automatically start up the multiple instantiations of the applications on the multiple Nodes. While this process works for existing applications (whose needs are known), it is not very adaptable since any new application desiring to be Cluster Aware requires recoding of the source code for the Cluster management software. Thus, there is a need for a process that provides High Availability to Cluster Aware applications while being agnostic as to the particular application being implemented.

SUMMARY

The present invention provides a process for providing High Availability in a Cluster without utilizing a fail-over mechanism. More specifically, the present invention utilizes a Multi-Node Package (MNP) to concurrently run on multiple Nodes on a Cluster and thereby provide the desired operational performance without the downtime associated with fail-over operations.

Instead of initiating a Package on a single Node, the present invention initiates a Package on every Node (or a desired percentage of Nodes) on a Cluster. Instead of an application failing-over to another Node, to ensure High Availability, the MNP merely shifts responsibilities for an application having faults or even possible faults on a first Node to another Node at which another instance of the Package is operating.

DESCRIPTION OF THE DRAWINGS

The detailed description will refer to the following drawings, wherein like numbers refer to like elements, and wherein.

DETAILED DESCRIPTION

Figure 1A:
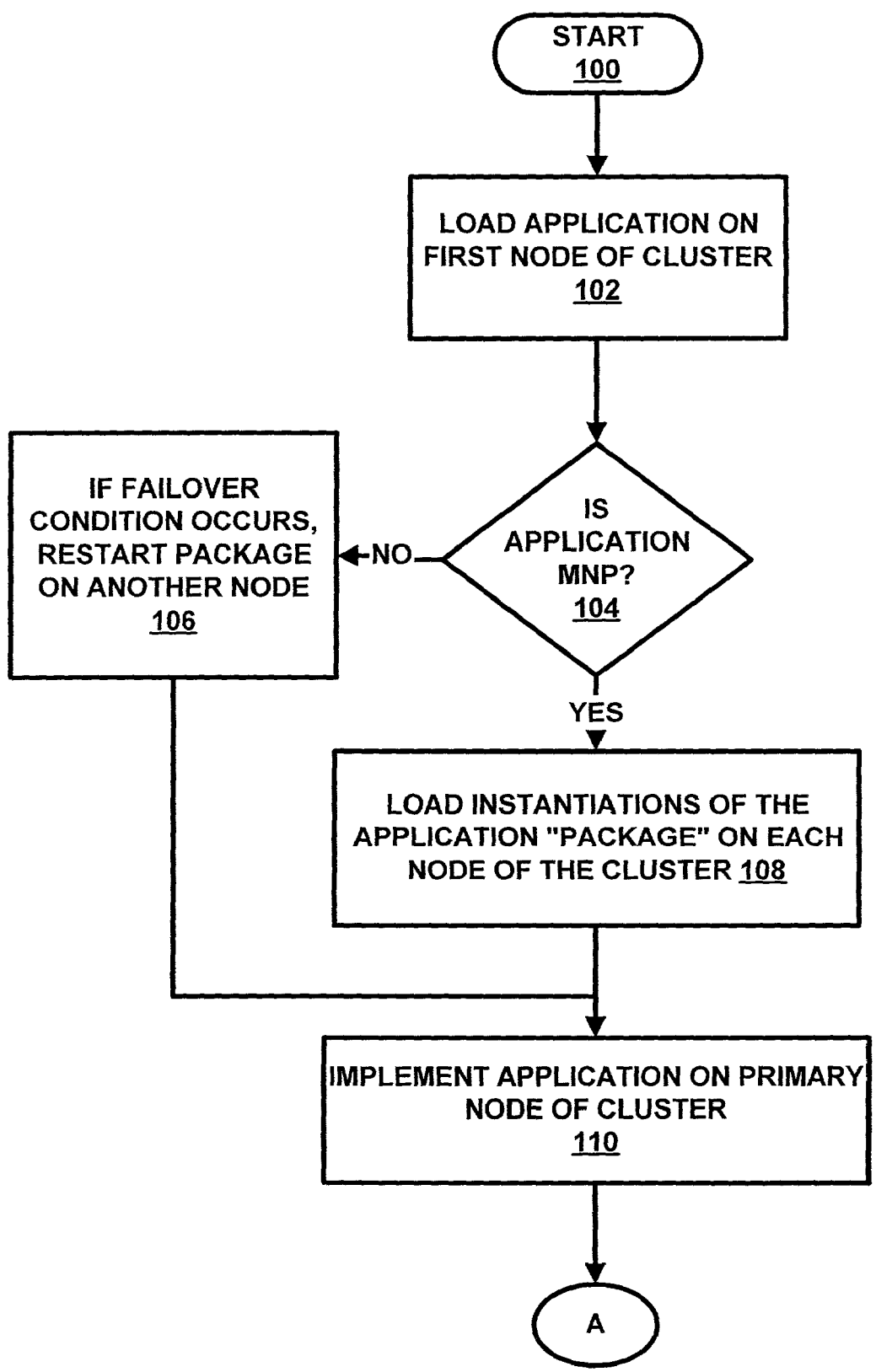
FIGS. 1A and 1B are representative flow charts of how a Cluster management system implementing the present invention utilizes the MNP of the present invention to provide High Availability applications.

As mentioned previously, the present invention provides a process for providing High Availability of applications implemented on a Cluster by utilizing MNPs which do not need or utilize a fail-over mechanism. The process utilizes any Package well known in the art and does not require specialized Packages or other applications. One example of a Package description is provided below:

```
****************************************************************
***
**** HIGH AVAILABILITY PACKAGE CONFIGURATION FILE
(template) ****
****************************************************************
***
******* Note: This file MUST be edited before it can be used.
******************
*** For complete details about package parameters and how to set them,
**********
*consult the MC/SERVICEGUARD or SERVICEGUARD OPS Edition
manpages**
*** or manuals.
***************************
#****************************************************************
***
# Enter a name for this package. This name will be used to identify the
package when viewing or manipulating it. It must be different from the
other configured package names.
PACKAGE_NAME    pencil
PACKAGE_TYPE    MULTI_NODE
NODE_NAME       *
RUN_SCRIPT      /etc/cmcluster/pencil/pencil.control
RUN_SCRIPT_TIMEOUT    NO_TIMEOUT
HALT_SCRIPT     /etc/cmcluster/pencil/pencil.control
HALT_SCRIPT_TIMEOUT    NO_TIMEOUT
SERVICE_NAME    samba_nmb_pencil
SERVICE_FAIL_FAST_ENABLED    NO
SERVICE_HALT_TIMEOUT    300
SERVICE_NAME    samba_smb_pencil
SERVICE_FAIL_FAST_ENABLED    NO
SERVICE_HALT_TIMEOUT    300
SUBNET    15.13.168.0
AUTO_RUN    YES
LOCAL_LAN_FAILOVER_ALLOWED    YES
NODE_FAIL_FAST_ENABLED    NO
```

By utilizing commonly available Packages, the present invention provides programmers and system designers with tremendous latitude and adaptability, as specialized code is not needed nor are changes to the source code required in order to expand an application's capabilities or to implement a Cluster aware application on a Cluster.

The present invention is configured such that when the Cluster management software detects a new Cluster aware application that is to be implemented on the Cluster, the software obtains the Package associated with one Node of the Cluster, copies the Package and loads the Package onto the desired other Nodes of the Cluster. The Custer management software knows of the existence of the Package on the other Nodes of the Cluster, such that whenever a fault occurs on one Node, other Nodes may be utilized to immediately implement the application without requiring a fail-over routine copying the needed information contained in the Package.

For one embodiment of the present invention, whenever an application is initiated on one Node of the Cluster, it also must have a Package initiated on every other Node of the Cluster. This embodiment is referred to as the System MNP (SMNP) and is commonly utilized when an application utilizes a Cluster membership roster to communicate amongst themselves.

However, another embodiment of the present invention does not require every Node to be running an instance of the Package. This configuration is referred to as the General Purpose MNP (GMNP) and might be utilized to balance a load on a Cluster while also providing High Availability. For example, an application might be configured to be run on only 50% of the Nodes, instead of all the Nodes on the Cluster. When a fault occurs on one Node, a second Node (for example, from the 50% containing the Package) suitably continues the operation of the application without requiring a fail-over to occur.

Figure 1B:
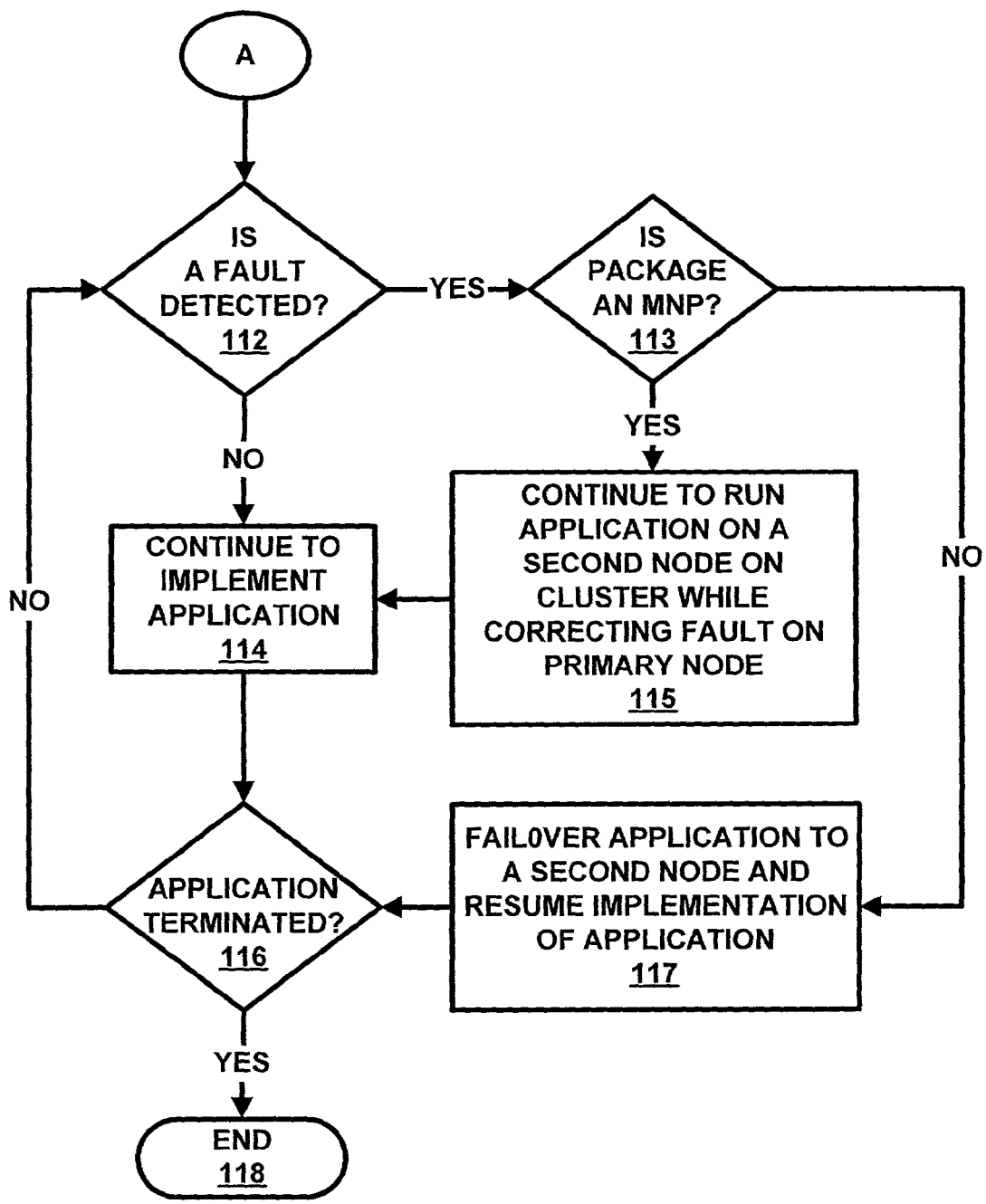

Referring now to FIGS. 1A and 1B, one embodiment of how a system utilizing the MNP of the present invention might be configured to operate in order to provide High Availability to an application running on a Cluster is shown. As shown, this process begins when an application is to be loaded onto a Node of a Cluster (Block 102). At the time of loading, the Package associated with the application is configured into the Cluster by informing the Cluster manager that there is a configuration change. This notification may be accomplished through a command, an input via a Graphical User Interface (GUI), or other methods known in the art. At this time, the Cluster manager performs some verifications of the new Package by confirming that all the attributes specified in the Package configuration are legitimate. One of these attributes will indicate whether the Package is a failover type, a GMNP type, or a SMNP type.

If the Package is a failover type (Block 104) the processing ends and the Cluster manager knows that if a failover condition occurs, it will restart the Package on another Node (Block 106). The processing then continues with Block 110, as explained hereinbelow. If the application is an MNP application (i.e., either a GMNP, and SMNP, or any other type of MNP), the failover behavior will not occur, but instead an instance of the Package will be started on all the Node (in the case of SMNP) or some subset of the Node (in the case of GMNP) (Block 108).

Further, it is to be appreciated that an application may or may not be Cluster Aware and still may utilize an MNP. However, since a Cluster Aware application generally knows that it has peer instances running on other Node in the Cluster, the present invention makes it easier to configure Cluster Aware applications so that how the specific application behaves (during start-up and during the handling of failures by instances of the application) is better controlled by the Cluster manager.

Referring again to FIGS. 1A and 1B, Block 108, at this instance all Nodes, or those designated Nodes, on the Cluster contain an instantiation of the Package (when the Package is of the MNP type). It is to be appreciated, that for certain applications, the Package may be an extremely large segment of operating instructions, software codes and other information that may be implemented by each Node on the Cluster. As such, the present invention may increase the load requirements for the Cluster as a whole, while eliminating the need to fail-over applications. Thus, those skilled in the art appreciate that, in certain circumstances, the General Purpose MNP embodiment may consider trade-offs between load factor and fail-over success that occur with the implementation of the present invention in deciding upon which Nodes a Package is to instantiated.

Referring again to FIGS. 1A and 1B, after the Package has been loaded on the desired Nodes of the Cluster, processing then continues with the application itself being implemented on the desired Node, i.e., herein the primary Node (Block 110). The application then continues to process on the primary Node as according to its normal routines and specifications. Meanwhile the Cluster management software preferably continues to monitor the implementation of the application and seeks to detect faults in the application (Block 112).

If a fault in the application is not detected, the application continues processing on the primary Node (Block 114) until either the application is terminated (Block 116) or a fault is detected (Block 112), whichever occurs first.

When a fault is detected, the Cluster management system suitably proceed along one of two paths (Block 113). If the Package is a MNP, the Cluster management takes appropriate actions which may include instructing a second Node (at which an instantiation of the Package was previously loaded) to assume the processing responsibilities for the application (Block 115) or even to stop attempting to communicate with the, now faulted, primary Node. It is to be appreciated that various faults may occur in an application. As such, various responses to such fault may be directed by the Cluster manager. Both the faults and possible responses thereto are too numerous to list here. As such, it is to be appreciated that the Cluster manager takes appropriate actions, which may include notifying other Nodes of the failure (when the application is Cluster aware and such notifications are appropriate), ceasing operations on the faulted Node, shifting application processing to another Node, and other actions. Further, when the application is Cluster aware and multiple instantiations of the application are being provided on at least the second Node, the transfer of processing capabilities can occur without a fail-over and preferably without any interruption in the data processing flow.

Once, if at all, the processing has been transferred to the second Node, the Cluster management system may then attempt to determine what caused the error on the primary Node and, if possible, correct the error. In certain embodiments, upon the correction of the error on the primary Node, the responsibility for implementing the application may be transferred back to the primary Node. Such a transfer might be desirable for load balancing purposes, proximity to data files, proximity of the Node to clients and/or for similar and other reasons. However, the process may also be implemented such that the second Node continues to process the application for an indefinite time period.

Referring again to Block 113, when the Package is not an MNP package, the processing then proceeds to Block 117. At this instance, the application is preferably failed-over to a second Node and implementation of the application is resumed thereon.

The process then resumes with looping through Blocks 112-114-116 until either the application is terminated or another fault occurs. It is to be appreciated that upon the second Node assuming the responsibilities for implementing the application, the second Node effectively becomes the primary Node and that the processing responsibilities may be transferred to a third Node on the Cluster, when available, as the detection of faults or other operating concerns dictate.

Further, it is to be appreciated that not every Package is capable of providing notification of instance failure. In certain embodiments, Package status and Package status change notifications may be provided via Application Program Interfaces (APIs) and other well known devices. Whiles such notifications are preferred, the present invention does not depend upon such notifications for its operation. Further, with MNPs it is to be appreciated that such APIs may also be configured to let a Cluster manager know that an instance of the package has changed state on a particular Node (i.e., started or stopped). Such capabilities may be desired for Cluster aware applications that communicate among their peer instances and may desire to transfer their load from a down instance to an up instance.

Further, it is to be appreciated that the process flow shown in FIGS. 1A and 1B, for purposes of simplicity, combines configuration and instance fault detection into one process flow. Each of which may be considered to be a separate process (i.e., the configuration steps may be considered distinct of the fault detection steps, and vice versa). More specifically, configuration usually occurs without any instances of the applications running. As such, it is not a common thing to make a non-Cluster aware application Clusteraware. The Cluster-aware application is either configured as a set of disjoint traditional failover packages (one package for each Node in the Cluster and these Packages do not specify failover nodes) or it is configured as a MNP.

As eluded to earlier, the MNP of the present invention provides certain advantages over the failover type of Package. First, with the MNP, Cluster management is more efficient. If the Cluster manager doesn't provide an MNP, the application is kind of "shoe-horned" into disjointed failover Packages. When these disjointed Packages fail, in order to halt the application on all the Nodes, the Cluster manager has to individually issue a halt command for each Package.

Second, Cluster management issues arise when a new node is added to the Cluster. For a SMP in particular, one generally wants to verify that when an existing SMP is configured on the Cluster and the Administrator wants to configure a new Node into the Cluster, that SMP will be able to start an instance of itself on that new node. This verification is built into the "All-Node Package", which might be a SMP that concurrently runs on all up Nodes or it might be a traditional failover package that can failover to any Node in the Cluster.

Further, once a Cluster manager decides whether they want a MNP or a traditional failover package and configure the application Package as such, the Cluster manager then knows to take a different action based upon the type of application Package. If it is a traditional failover package it will failover the application to an adoptive Node. If it is a SMP, it notes the failure and, if appropriate, notifies any Cluster-aware Nodes that may have registered for such notifications of the failure. Further, if the Package is a GMNP, it will do the same thing as a SMP, but in a "load balancing" embodiment. When load balancing, the Cluster manager utilizes the specifications for the Package to determine how to transfer the application. For example, such load balancing may indicate that that Package should run one at least "x" number of Nodes or at least "y"% of the Nodes in the Cluster. As such, the cluster manager may try to start another instance of the package on a Node where an instance of that package is not currently running, or, if the load balance thresholds are being met, the Cluster manager may not start another instance of the Package. A starting of another instance of the Package on another Node, however, is not a failover because any running instances on Nodes that did not fail will continue to run while the new instance is started on the new Node.

As such, the present invention provides for High Availability on Cluster aware applications, without using a fail-over technique, by utilizing multiple instantiations of Packages on multiple (if not all) Nodes of a Cluster. Such MNPs provide for near seamless transitions of applications across Nodes.

Further, it is also to be appreciated that the processes of the present invention may be suitably utilized to also determine system utilization levels, application efficiencies and other information relating to an implementation of an application.

Lastly, while the present invention has been described in the context of process flows, Packages, Clusters and networked environments, it is to be appreciated that the present invention is not so limited. Containers of information (whether they be Packages or in other formats) may be utilized in accordance with the present invention for other and/or additional purposes as provided for in the detailed description, drawing figures and claims.

What is claimed is:

1. A process for providing High Availability applications in a Cluster environment comprising;
   establishing a first instance of a Package for an application on a first Node of a Cluster;
   establishing at least one second instance of the Package on at least one second Node of the Cluster;
   implementing the application on the first Node; and
   transferring implementation of the application to the at least one second Node when a fault is detected on the first Node, wherein the application is initially not Cluster aware and the process further comprises generating a Cluster aware Package for the application.

2. The process of claim 1, wherein the application is a Cluster aware application.

3. The process of claim 1, wherein the Package contains information necessary for the application to be implemented on a Node of the Cluster.

4. The process of claim 1, wherein the application further comprises a database application.

5. The process of claim 1, wherein the application further comprises a volume management service.

6. The process of claim 1, wherein the Package is loaded onto every Node of the Cluster.

7. The process of claim 1, wherein the Package is loaded on to less than every Node of the Cluster.

8. The process of claim 7, wherein a determination as to which Nodes of a Cluster on which to load the Package is based upon a consideration to balance a load across at least two Nodes on the Cluster.

9. The process of claim 1, wherein the fault condition is detected for the application on the first Node by a Cluster management system.

10. The process of claim 9, wherein addition to monitoring the first Node for the fault, the Cluster management system also balances a load across the Cluster by transferring applications to be performed by the Cluster between the first Node and the at least one second Node.

11. The process of claim 10, wherein the process of transferring implementation responsibility occurs without requiring the first Node to fail-over the application to any of the at least one additional Node.

12. The process of claim 1, wherein each instantiation of the Package contains sufficient information to implement the application on any Node of the Cluster without requiring the first Node to fail-over the application to at least one of the at least one second Node.

13. A system utilized to provide High Availability to an application comprising:
   a first Node containing a Package, the Package providing information utilized to implement an application on a Cluster;
   at least one second Node containing a second instantiation of the Package; and
   a Cluster management system utilized to monitor the operation of the application on the first Node;
   whereupon detecting a fault condition in the implementation of the application on the first Node, the Cluster management system transfers implementation of the application to the at least one second Node,
   wherein the at least one second Node utilizing the second instantiation of the Package to implement the application, and
   wherein the transfer of the application from the first Node to the at least one second Node occurs without the application having to fail-over and the application is initially not Cluster aware and a process generates a Cluster aware Package for the application.

14. The system of claim 13, wherein the application further comprises a database application.

15. The system of claim 13, wherein the application is Cluster aware.

16. The system of claim 13, wherein an instantiation of the Package is instantiated on every Node of the Cluster.

17. The system of claim 13, wherein an instantiation of the Package is provided on less than every Node of the Cluster.

18. The system of claim 17, wherein a determination as to which Node of the Nodes on a Cluster are to receive an instantiation of the Package is based upon a load balancing factor.

19. A computer readable medium containing instructions to transfer an application from a first Node on a Cluster to a second Node on the Cluster, wherein both the first Node and the second Node include instantiations of a Package containing information utilized to implement the application, by:
   establishing a first instance of the Package for the application on the first Node of the Cluster;
   establishing at least one second instance of the Package on the second Node of the Cluster;
   implementing the application on the first Node; and
   transferring implementation of the application to the second Node when a fault is detected on the first Node, wherein the application is initially not Cluster aware and the process further comprises generating a Cluster aware Package for the application.

20. The computer readable medium of claim 19, wherein each instantiation of the Package contains sufficient information to implement the application on any Node of the Cluster without requiring the first Node to fail-over the application to at least one of the at least one second Node.

21. A computer readable medium containing instructions for implementing a process for avoiding failing over of an application on a Cluster, by:
   implementing an application on first Node of a Cluster, wherein the first Node and at least one additional Node on the Cluster include a Package containing information needed to implement the application on the Cluster; and transferring implementation responsibility of the application from the first Node to the at least one additional Node when a fault condition is detected for the application on the first Node, wherein the application is initially not Cluster aware and the process further comprises generating a Cluster aware Package for the application.

* * * * *